3,036,073
TETRAHYDROPYRIMIDINE DERIVATIVES
Roy Hull, Macclesfield, and Geoffrey Swain, Manchester, England, assignors to Imperial Chemical Industries Limited, Millbank, London, England, a corporation of Great Britain
No Drawing. Filed Nov. 2, 1959, Ser. No. 850,024
Claims priority, application Great Britain Dec. 5, 1958
2 Claims. (Cl. 260—251)

This invention relates to organic compounds and more particularly it relates to pyrimidine derivatives which possess therapeutic properties.

According to the invention we provide tetrahydropyrimidine derivatives of the formula:

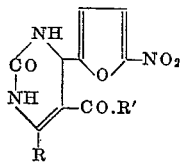

wherein R stands for an amino group and R' stands for an hydroxy group or R stands for a lower alkyl radical optionally substituted by halogen or by a morpholino radical and R' stands for a lower alkoxy radical, a lower alkyl radical or an anilino radical which may optionally be substituted.

Suitable examples of the substituent (R) may be amino, methyl, bromomethyl and morpholinomethyl radicals and suitable examples of the substituent (R') may be hydroxy, methyl, methoxy, ethoxy and anilino radicals.

Particularly useful compounds are 5-methoxycarbonyl-6 - methyl - 4 - (5 - nitrofuryl) - 2 - oxo - 1:2:3:4 - tetrahydropyrimidine, 5-ethoxycarbonyl-6-methyl-4-(5-nitrofuryl)-2-oxo-1:2:3:4-tetrahydropyrimidine, 6-amino-4-(5-nitrofuryl) - 2 - oxo - 1:2:3:4 - tetrahydropyrimidine-5-carboxylic acid, 5-acetyl-6-methyl-4-(5-nitrofuryl)-2-oxo - 1:2:3:4 - tetrahydropyrimidine, 6 - bromomethyl-5 - ethoxycarbonyl - 4 - (5 - nitrofuryl) - 2 - oxo - 1:2:3:4 - tetrahydropyrimidine, 5 - ethoxycarbonyl - 6 - morpholinomethyl - 4 - (5 - nitrofuryl) - 2 - oxo - 1:2:3:4-tetrahydropyrimidine and 6-methyl-4-(5-nitrofuryl)-2-oxo - 5 - N - phenycarbamoyl - 1:2:3:4 - tetrahydroyrimidine, and of these the preferred compound is 5-methoxycarbonyl - 6 - methyl - 4 - (5 - nitrofuryl) - 2 - oxo - 1:2:3:4-tetrahydropyrimidine.

According to a further feature of the invention we provide a process for the manufacture of certain of the said pyrimidine derivatives which comprises interaction of urea, 5-nitro-2-furaldehyde or a functional derivative thereof and a compound of the formula:

$$R_1CH_2—CO.R_2$$

wherein $R_1$ stands for a cyano radical and $R_2$ stands for an hydroxy group or $R_1$ stands for the radical $R_3.CO$ wherein $R_3$ stands for a lower alkyl radical and $R_2$ stands for a lower alkoxy radical or for an anilino radical optionally substituted, under acidic conditions.

The 5-nitro-2-furaldehyde used as a functional derivative thereof may be for example in the form of 5-nitro-2-furaldehyde diacetate.

The compound used as starting material may be for example cyanacetic acid, methyl acetoacetate, ethyl acetoacetate or acetoacetanilide. The process is conveniently carried out in the presence of an inert diluent or solvent for example methanol or ethanol. The acid present in the reaction medium may be an inorganic acid for example hydrochloric acid or a strong organic acid as for example trifluoroacetic acid. The reaction may be accelerated or completed by the application of heat.

According to a further feature of the invention we provide a process for the manufacture of those compounds of the invention wherein R stands for a lower alkyl radical optionally substituted by halogen or by a morpholino radical which comprises halogenating a compound of the formula:

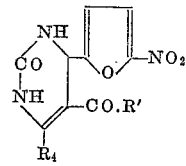

wherein R' has the meaning stated above and $R_4$ stands for a lower alkyl radical followed if necessary by reaction of the halogeno compound within morpholine.

The halogenating agent may be for example bromine and the reaction is preferably carried out in the presence of an inert diluent or solvent for example acetic acid.

The reaction of a halogeno compound for example 6 - bromomethyl - 5 - ethoxycarbonyl - 4 - (5 - nitrofuryl)-2-oxo-1:2:3:4-tetrahydropyrimidine and morpholine is conveniently carried out in the presence of an inert diluent or solvent for example benzene.

According to a further feature of the invention we provide a process for the manufacture of the compound of the invention wherein R and R' stand for methyl radicals which comprises heating 5-nitro-2-furaldehyde diureide with acetylacetone in the presence of a mineral acid.

The compounds of the present invention show chemotherapeutic activity against *Lymphogranuloma inguinale* in experimental animals and they are of use in the treatment of a related disease in man which is caused by the trachoma virus.

A particularly valuable compound is 5-methoxycarbonyl - 6 - methyl - 4 - (5 - nitrofuryl) - 2 - oxo - 1:2:3:4-tetrahydropyrimidine.

Thus according to a further feature of the invention we provide pharmaceutical compositions wherein the active ingredient comprises one or more of the tetrahydropyrimidine derivatives of the formula stated above, in admixture with non-toxic pharmaceutically-acceptable diluents or carriers therefor.

As suitable pharmaceutical compositions there may be mentioned for example ointments, creams, jellies, lotions and the like which can be applied safely to the eye.

The invention is illustrated but not limited by the following examples in which the parts are by weight:

*Example 1*

A mixture of 120 parts of 5-nitro-2-furaldehyde diacetate, 34 parts of urea, 86.5 parts of methylacetoacetate and 88 parts of 9% methanolic hydrogen chloride is stirred and heated under reflux in 304 parts of methanol during six hours. The reaction mixture is then cooled and allowed to stand for one day. The mixture is filtered and the solid residue is washed with methanol and there is thus obtained 5'-methoxycarbonyl-6-methyl-4 - (5 - nitrofuryl) - 2 - oxo - 1:2:3:4 - tetrahydropyrimidine, M.P. 246° C. with decomposition.

*Example 2*

A mixture of 10 parts of 5-nitro-2-furaldehyde diacetate, 2.74 parts of urea, 7 parts of ethyl acetoacetate and 6.6 parts of 9.2% ethanolic hydrogen chloride is stirred and heated under reflux in 13.5 parts of ethanol during 2½ hours. The reaction mixture is then cooled and filtered and the solid residue is washed with ethanol. There is thus obtained 5-ethoxycarbonyl-6-methyl-4-(5-nitrofuryl)-2-oxo-1:2:3:4-tetrahydropyrimidine, M.P. 187–189° C.

*Example 3*

3.6 parts of cyanacetic acid, 5 parts of 5-nitro-2-furaldehyde and 0.15 part of 35% aqueous hydrochloric acid are added to a hot solution of 2.3 parts of urea in 12 parts of ethanol. The reaction mixture is warmed and the resulting solution is allowed to stand during 3 hours. The mixture is then filtered and the solid residue is washed with water and is then dissolved in hot ethylene glycol and diluted with water to the point of incipient precipitation. There is thus obtained 6-amino-4-(5-nitrofuryl)-2-oxo-1:2:3:4 - tetrahydropyrimidine-5-carboxylic acid, M.P. above 300° C.

*Example 4*

Hydrogen chloride gas is passed into a stirred mixture of 7 parts of 5-nitro-2-furaldehyde diureide and 25 parts of acetylacetone at 90–100° C. during 1 hour and the reaction mixture is then cooled and filtered. The solid residue is crystallised from aqueous ethanol and there is thus obtained 5-acetyl-6-methyl-4-(5-nitrofuryl)-2-oxo-1:2:3:4-tetrahydropyrimidine, M.P. 252–254° C. with decomposition.

The 5-nitro-2-furaldehyde diureide used as starting material may be obtained by adding a solution of 14.1 parts of 5-nitro-2-furaldehyde in 40 parts of ethanol to a hot solution of 12 parts of urea in 10 parts of water followed by 1.18 parts of 35% aqueous hydrochloric acid. The mixture is then heated under reflux during 30 minutes and then cooled and filtered. The solid residue is washed with 50% aqueous ethanol and there is thus obtained 5-nitro-2-furaldehyde diureide, M.P. 178–179° C. with decomposition.

*Example 5*

1.6 parts of bromine in 10 parts of acetic acid is added dropwise to 2.95 parts of 5-ethoxycarbonyl-6-methyl-4-(5-nitrofuryl)-2-oxo-1:2:3:4-tetrahydropyrimidine (prepared as described in Example 2), in 40 parts of acetic acid at 20° C. The mixture is allowed to stand for one day. The solution is then added with stirring to 400 parts of water and the mixture so obtained is filtered. The solid residue is washed with water and is crystallised from ethanol. There is thus obtained 6-bromomethyl-5-ethoxycarbonyl-4-(5-nitrofuryl)-2 - oxo1:2:3:4 - tetrahydropyrimidine, M.P. 154° C. with decomposition.

*Example 6*

A mixture of 1.72 parts of 6-bromomethyl-5-ethoxycarbonyl-4-(5-nitrofuryl)-2-oxo - 1:2:3:4 - tetrahydropyrimidine (prepared as described in Example 5), 0.8 part of morpholine and 88 parts of benzene is heated under reflux during 30 minutes. The mixture is then cooled, allowed to stand for one day and filtered. The filtrate is evaporated to dryness and the residue is crystallised from a mixture of benzene and petroleum ether (B.P. 60–80° C.). There is thus obtained 5-ethoxy-carbonyl-6-morpholinomethyl-4-(5-nitrofuryl)-2-oxo - 1:2:3:4 - tetrahydropyrimidine, M.P. 132–140° C.

*Example 7*

0.075 part of 35% aqueous hydrochloric acid and mixed hot solutions of 1.77 parts of acetoacetanilide in 4.8 parts of ethanol and 0.6 part of urea in 6.3 parts of ethanol are added to 1.41 parts of 5-nitro-2-furaldehyde in 1.6 parts of ethanol and the mixture is heated under reflux during 4 hours. The reaction mixture is then cooled to 18–23° C. and is allowed to stand for 18 hours. 30 parts of water and 0.5 part of carbon is added and the mixture is heated and then filtered and allowed to cool. The mixture is filtered and the solid residue is crystallised from ethanol. There is thus obtained 6-methyl-4-(5-nitrofuryl)-2-oxo-5-N-phenylcarbamoyl-1:2:3:4 - tetrahydropyrimidine, M.P. 224° C. with decomposition.

*Example 8*

A mixture of 3 parts of 5-nitro-2-furaldehyde, 1.4 parts of urea, 3.7 parts of methylacetoacetate and 0.65 part of trifluoroacetic acid is heated under reflux in 12 parts of methanol during three hours. The reaction mixture is then cooled and allowed to stand for 24 hours. The mixture is evaporated to dryness under reduced pressure and 25 parts of water are added. The mixture is heated to the boiling point, 12 parts of ethanol are added and the mixture is shaken 5 minutes and then cooled. The mixture is then filtered and the solid residue is washed with a small amount of ethanol and is crystallised from aqueous-acetic acid. There is thus obtained 5-methoxycarbonyl-6-methyl-4-(5-nitrofuryl)-2-oxo-1:2:3:4 - tetrahydropyrimidine, M.P. 246° C. with decomposition.

*Example 9*

A mixture of 3 parts of 5-nitro-2-furaldehyde, 1.4 parts of urea, 4.15 parts of ethylacetoacetate and 0.12 part of 35% aqueous hydrochloric acid is heated under reflux in 12 parts of ethanol during 4 hours. The reaction mixture is then cooled and allowed to stand for 48 hours. The mixture is filtered and the solid residue is washed with ethanol. There is thus obtained 5-ethoxycarbonyl-6-methyl-4-(5-nitrofuryl)-2-oxo-1:2:3:4 - tetrahydropyrimidine, M.P. 187–189° C.

*Example 10*

A mixture of 3.0 parts of 5-nitro-2-furaldehyde, 1.4 parts of urea, 3.7 parts of methylacetoacetate and 0.12 part of 35% aqueous hydrochloric acid is heated under reflux during 4 hours. The reaction mixture is then cooled and allowed to stand for 48 hours. The mixture is filtered and the solid residue is washed with methanol and there is thus obtained 5-methoxycarbonyl-6-methyl-4 - (5 - nitrofuryl) - 2 - oxo - 1:2:3:4 - tetrahydropyrimidine, M.P. 246° C. with decomposition.

*Example 11*

A mixture of 25 parts of castor oil and 5 parts of cetostearyl alcohol at 60–65° C. is added with stirring to a solution of 1 part of Cetomacrogol 1000 B.P.C. (a cream coloured waxy unctuous mass prepared by condensing cetyl or cetostearyl alcohol with ethylene oxide under controlled conditions and represented by the formula $CH_3(CH_2)_mOCH_2(CH_2OCH_2)_nCH_2OH$ where $m$ is 15 or 17 and $n$ is 19 to 23) and 3.5 parts of 5-methoxycarbonyl- 6 - methyl - 4 - (5 - nitrofuryl) - 2 - oxo - 1:2:3:4 - tetrahydropyrimidine in 65.5 parts of water at 60–65° C. The mixture so obtained is emulsified and homogenised by known means and there is thus obtained a cream possessing therapeutic properties and suitable for application to the eye.

What we claim is:

1. A tetrahydropyrimidine having a formula selected from the group consisting of:

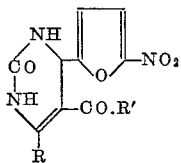

and

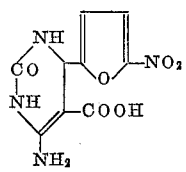

wherein R is selected from the group consisting of lower alkyl, halo-lower alkyl an morpholino-lower alkyl and R' is selected from the group consisting of lower alkoxy, lower alkyl and anilino.

2. The compound 5-methoxycarbonyl-6-methyl-4-(5-nitrofuryl)-2-oxo-1:2:3:4-tetrahydropyrimidine.

References Cited in the file of this patent

Degering: An Outline of Organic Nitrogen Compounds, page 426 (1950).